Jan. 27, 1948.　　　　B. McKIM　　　　2,434,946
TONE SUPPLY TEST CIRCUIT
Filed March 16, 1944　　　6 Sheets-Sheet 1

INVENTOR
B. McKIM
BY
ATTORNEY

Jan. 27, 1948.                B. McKIM                    2,434,946
                         TONE SUPPLY TEST CIRCUIT
                    Filed March 16, 1944        6 Sheets-Sheet 2

INVENTOR
B. McKIM
BY
ATTORNEY

Jan. 27, 1948.　　　　B. McKIM　　　　2,434,946
TONE SUPPLY TEST CIRCUIT
Filed March 16, 1944　　　6 Sheets-Sheet 5

INVENTOR
B. McKIM
BY
ATTORNEY

Jan. 27, 1948.    B. McKIM    2,434,946
TONE SUPPLY TEST CIRCUIT
Filed March 16, 1944    6 Sheets-Sheet 6
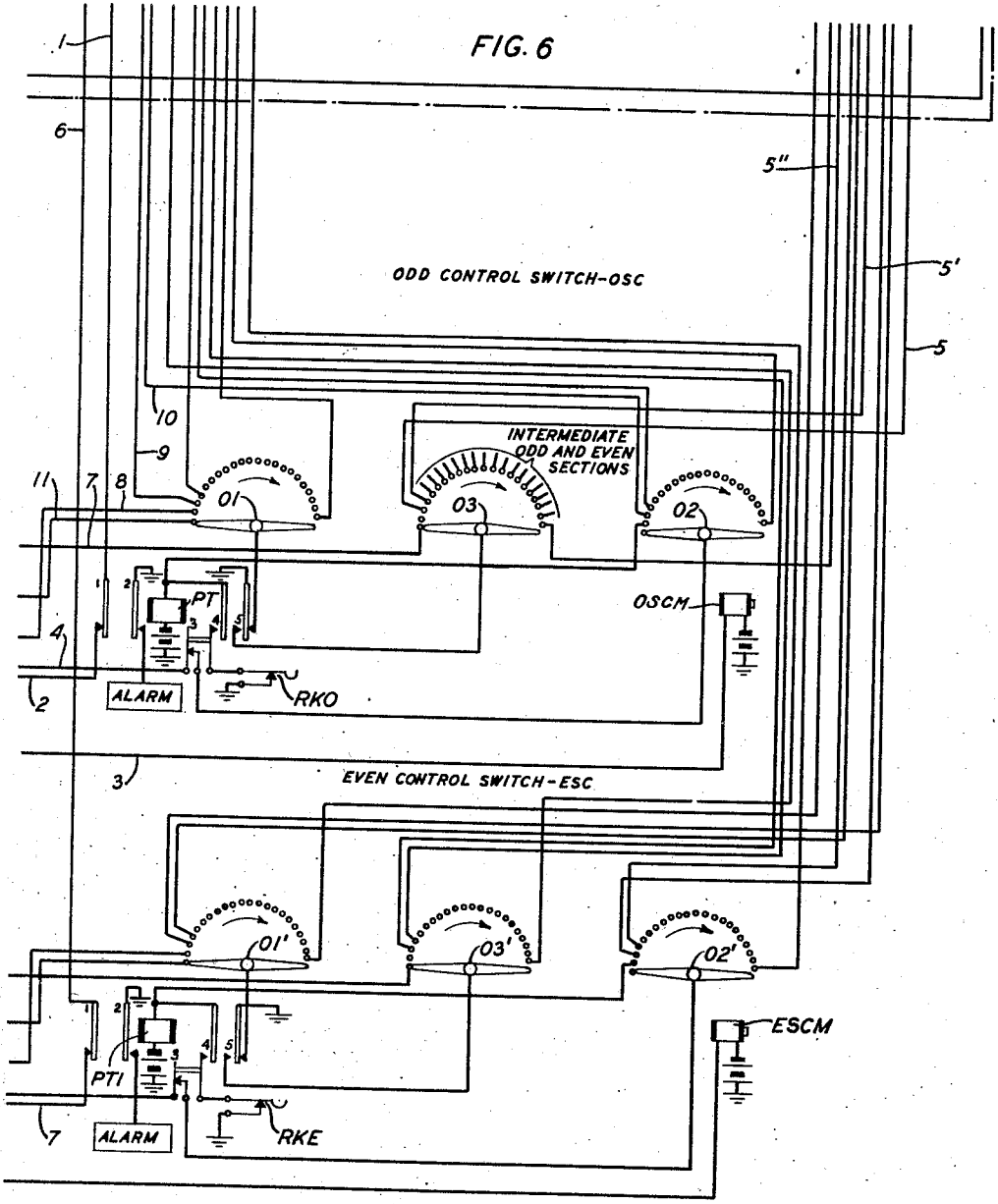
INVENTOR
B. McKIM
BY
ATTORNEY Patented Jan. 27, 1948

2,434,946

UNITED STATES PATENT OFFICE 2,434,946

TONE SUPPLY TEST CIRCUIT

Burton McKim, East Orange, N. J., assignor to Bell Telephone Laboratories, Incorporated, New York, N. Y., a corporation of New York Application March 16, 1944, Serial No. 526,765

10 Claims. (Cl. 179—175.2)

This invention relates to electric supply circuits and automatic means for intermittently checking the outputs therefrom, including means for switching out of service one or more such supply circuits when their respective outputs do not check within predetermined limits. More particularly the invention relates to a plurality of alternating current sources for use in a telephone central exchange in which connections are to be established from operators' positions therein by means responsive to signals composed of different frequencies obtained from said sources, and to an automatic test circuit which, being arranged to check intermittently the output voltage of each source, disconnects any source from the positions to which it is allocated when the voltage is outside predetermined limits and then rechecks the voltage of the source apparently at fault to determine if the source or the positions are at fault. If the source is at fault, the positions are switched to another available source; if the source is not at fault, the positions are reconnected individually or in groups until the fault reappears, in which case the position or group of positions presumably at fault is locked out and the remaining positions or groups thereof are reconnected to said source.

According to a prevailing practice in telephone offices which are provided with facilities for establishing connections by means of frequency signaling or "alternating current key-pulsing," as it is more often called, and as exemplified, for instance, by the telephone key-pulsing system disclosed in Patent 2,288,251 granted to P. B. Murphy on June 30, 1942, four separate sets of signal frequencies or groups of oscillators are provided, and the number of operators' positions from which calls are to be established therefrom are divided into approximately four equal groups with the positions in each group obtaining their signaling currents from one of the four oscillator groups. With this arrangement, each group of oscillators normally carries about 25 per cent of the office load. Means are provided whereby if trouble should develop in any position or in any oscillator, as, for example, the voltage output of the oscillator being above or below the prescribed limits, the entire group of positions deriving their current supply from the oscillator group which includes the (possibly) offending oscillator is transferred to one of the remaining three groups which then will carry twice its normal load. If this transfer should introduce trouble in one or more of the oscillators of the group carrying the positions switched over in addition to its own, thereby indicating that the cause of the trouble is in one or more of the positions switched rather than in an oscillator, then all the positions normally allocated to the oscillator group from which they were originally disconnected are removed from service until the cause of the trouble has been found and removed, when they are then reconnected back to their associated oscillator group. According to above arrangement, therefore, if the trouble is in a position or positions being served by one group of oscillators, all the positions in the group must be taken out of service and kept out until the trouble is cleared. Although all the positions of the office can well be carried by two groups of oscillators instead of four, with the positions divided equally between the two, and with switch-over facilities provided to transfer all positions on one group of oscillators to the other, yet to reduce the number of positions which might be taken out of service in the event of trouble, four groups of oscillators are usually provided and the positions are equally divided between the four. With this arrangement, only a quarter of the number of positions will be effected in the event of trouble in one oscillator group or in the common equipment between the group and the positions served thereby.

According to one feature of my invention the number of oscillator groups is reduced from four to two and the office positions are divided into approximately equal sections between them. A voltage test circuit is provided to test intermittently the voltage output of each oscillator in each group and when the test indicates an over-voltage or under-voltage condition for an oscillator under test, the positions obtaining their signal voltages from the group of oscillators which includes the one tested are disconnected therefrom and the oscillator is again tested. If the voltage is again abnormal, it is assumed that the oscillator is defective, whereupon all positions serviced by the group of oscillators that includes the defective oscillator are switched in steps over to the other group of oscillators which now service all the positions in the office. If, with the positions disconnected, the voltage on the presumably defective oscillator becomes normal, it is then assumed either that the equipment common to the positions disconnected is in trouble or that some one or more of the individual positions is in trouble. In either event, each position or group of positions is reconnected in succession to the group of oscillators, and after reconnection a voltage test is then made of the output voltage of the oscillator giving the abnormal voltage. When the defective position or group of positions is reconnected, the voltage test will give the tell-tale of the over-, or under-voltage condition and will thereby indicate which position or group of positions is in trouble, said position or group of positions being then taken out of service while the remaining positions are reconnected back to the oscillator group. Thus according to my invention, not only are the number of oscillators reduced by half over the number now normally provided but, what is more important, in the event of a trouble occurring in one or more of the positions, only the offending position or positions need be taken out of service for investigation.

This and other features of my invention will be more readily ascertained from the following description, appended claims and attached drawings in which:

Figs. 5 and 6 show the oscillator test circuit; while

Figure 2:
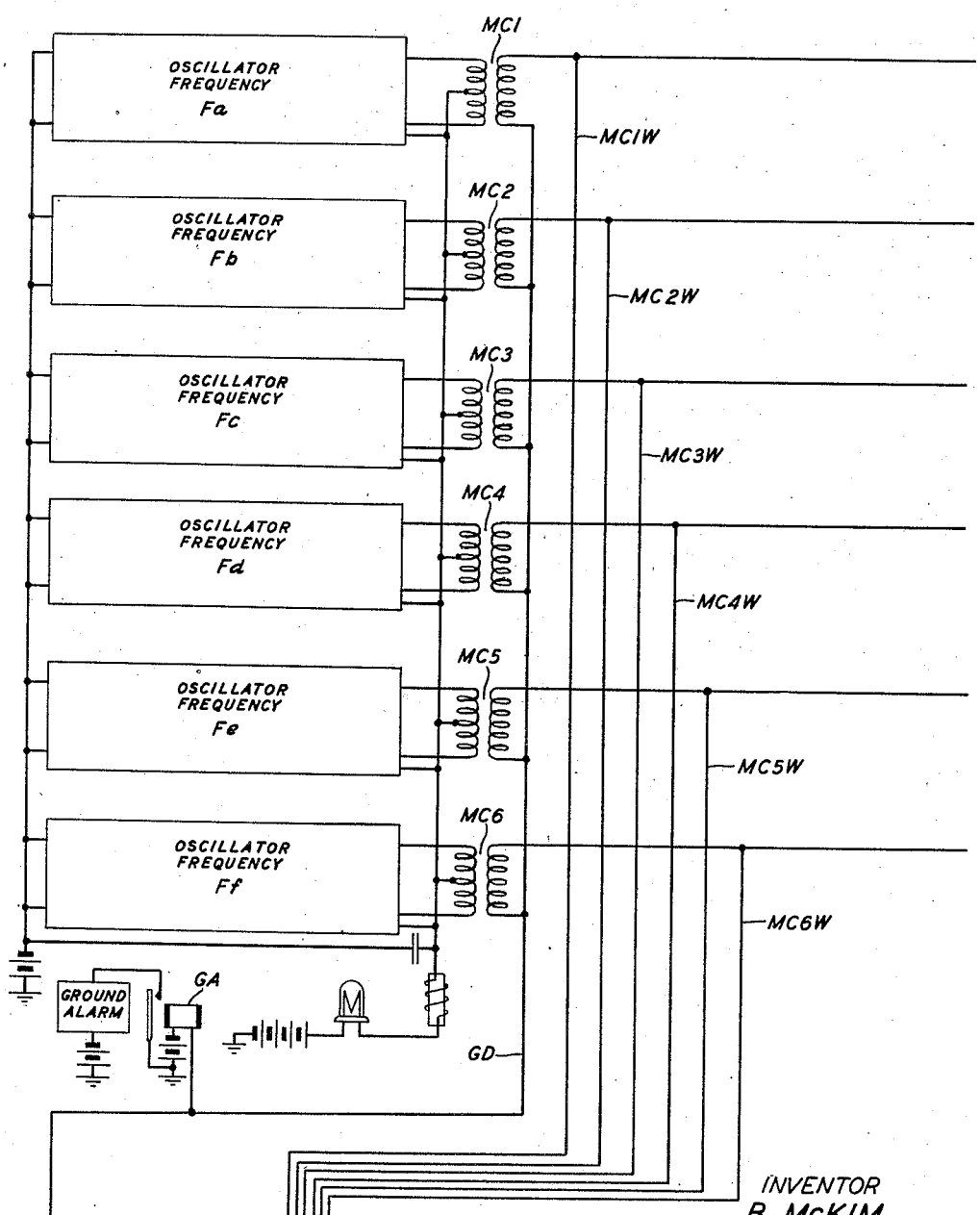
Fig. 2 shows one of the two groups of oscillators and Fig. 4 the other group.
Figure 4:
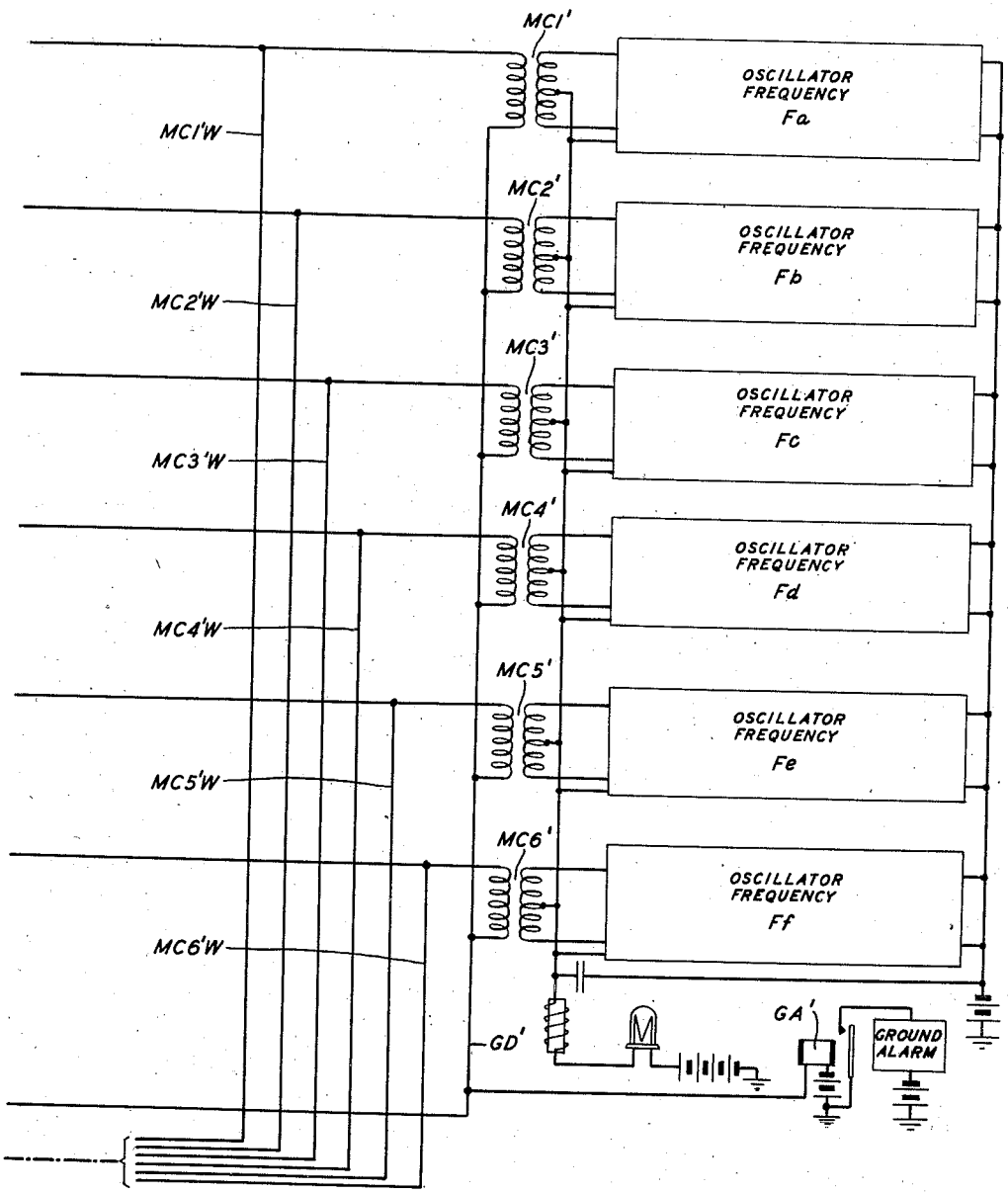

Referring now to the various figures, it will be noted that each group of oscillators as shown in Figs. 2 and 4 comprises six oscillators (which may be of any suitable design) with corresponding ones in each group producing the same frequency. Thus if we assume that the six signal frequencies are arbitrarily indicated as $a$—$f$, then the oscillator $Fa$ in Fig. 2 is used for generating frequency $a$ and the corresponding oscillator $Fa$ in Fig. 4 generates the same frequency. The remaining five oscillators $Fb$—$Ff$ in each group produce the indicated frequencies therefor, corresponding oscillators in each group being oppositely disposed in location in each of the two Figs. 2 and 4.

Each oscillator in each group is connected to the input winding of a transformer MC— and the lower terminals of the output winding of each of these transformers are connected together by conductor GD (for the six transformers MC1—MC6 in Fig. 2) and by conductor GD' (for the six transformers MC1'—MC6' in Fig. 4) to the terminals of the arc individual to brush TS1 of the rotary test switch TS, conductor GD being multiplied to the first six terminals of the arc and conductor GD1' being multiplied to the next six terminals. The upper terminal of each winding of said transformers extends, on the one hand to an appropriate contact of a load section relay OSR or ESR from which it is then extended in parallel over conductors $Ca$—$Cf$ to the key-sets of the positions in an odd or even load "section," as the case may be, and, on the other hand, each of said terminals is paralleled to a terminal on the arc individual to brush TS2 of the test switch TS, the terminals of the transformers MC1—MC6 being extended, respectively, to the first six terminals of said arc by means of conductors MC1W—MC6W and the terminals of the transformers MC1'—MC6' being extended, respectively, to the next six terminals on said arc by means of conductors MC1'W—MC6'W.

The connection of the upper terminal of the output winding of the transformers MC— in both groups to the armatures of the load section relays OSR and OSR' is made in accordance with the combination of frequencies which is to be applied to the trunk suitably connected to a position upon the closure of any individual key in the key-set KS provided at said position. In the present embodiment of the invention, the connection shown is in accordance with the two-frequency-per-digit or character code utilized in many alternating current key-pulsing installations and is as follows:

| Key | Frequencies |
| --- | --- |
| 0 | $a, b$ |
| 1 | $a, d$ |
| 2 | $b, d$ |
| 3 | $d, e$ |
| 4 | $b, e$ |
| 5 | $c, d$ |
| 6 | $a, c$ |
| 7 | $b, c$ |
| 8 | $c, e$ |
| 9 | $a, e$ |
| KP | $c, f$ |
| ST | $e, f$ |

Figure 1:
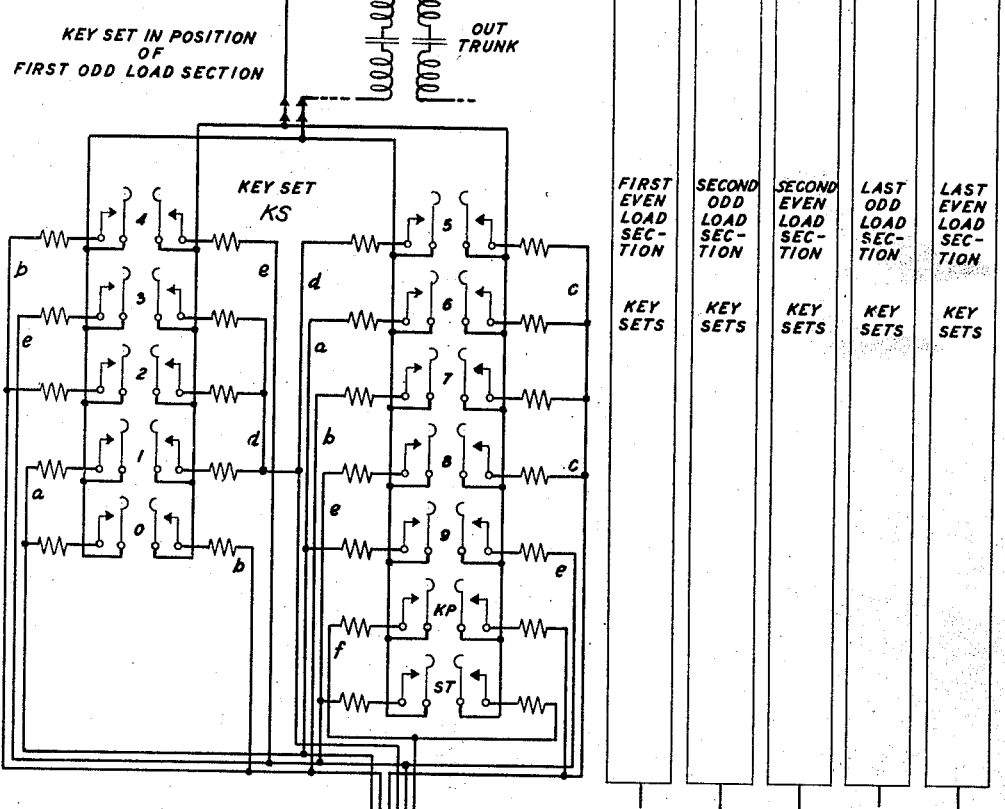
Fig. 1 shows the detailed wiring of the key-set of a positional circuit together with conventional indications of the positions of the office divided into odd and even load sections each containing approximately an equal number of positions.
Figure 7:
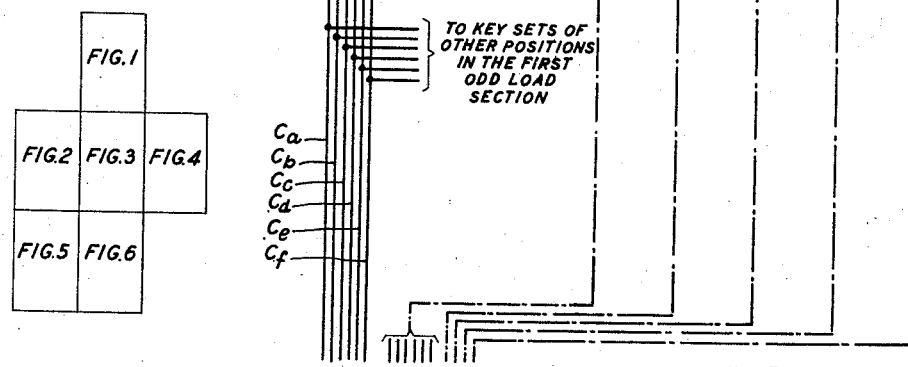
Fig. 7 shows the manner in which Figs. 1 to 6, inclusive, are to be arranged with respect to each other in order to disclose the invention.
Figure 3:
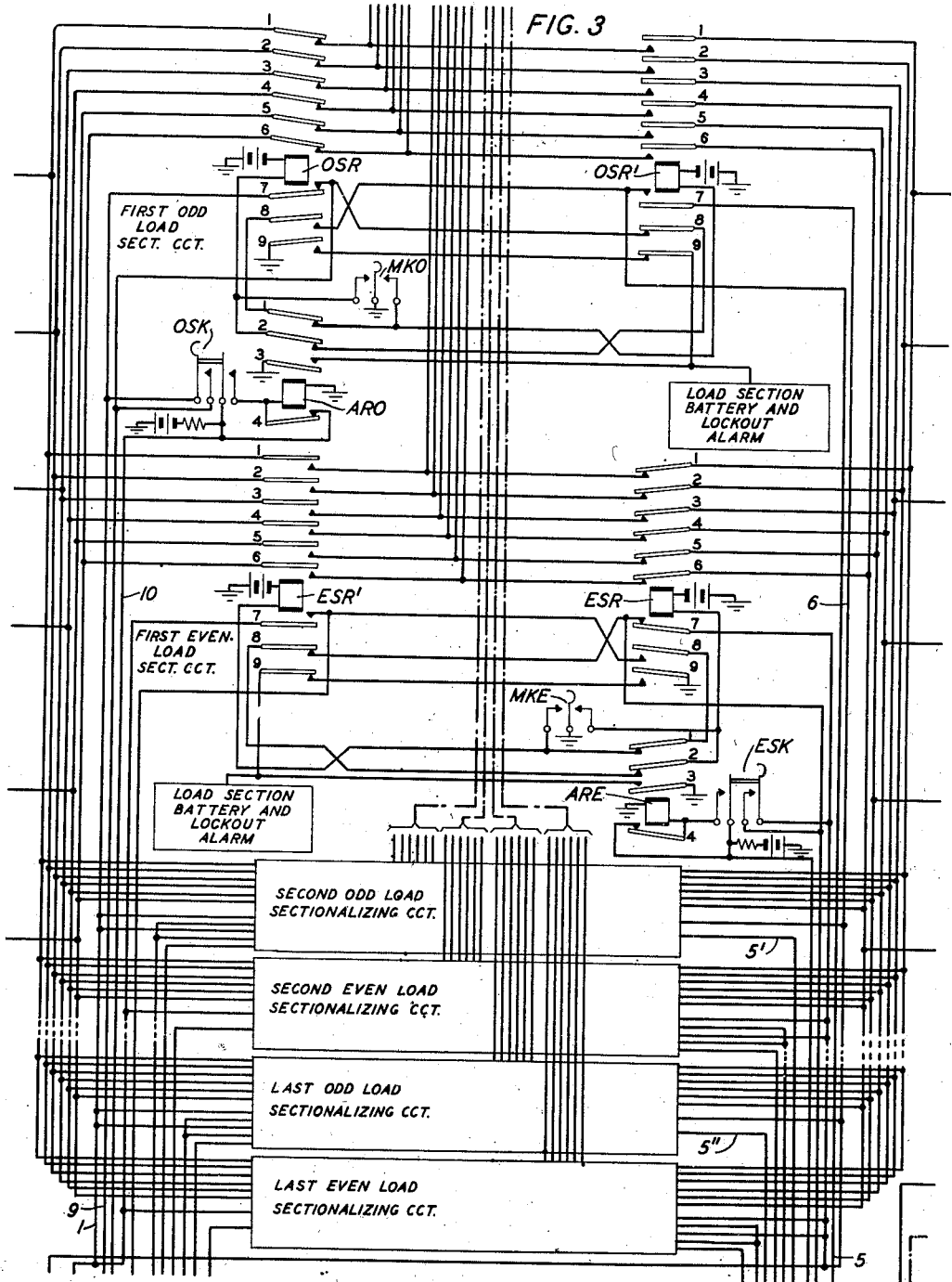
Fig. 3 shows the sectionalizing circuit by means of which the key-sets of the different positions in the different load sections are connectively distributed between the two groups of oscillators.

As will be seen from Figs. 1 and 3, all of the positions in the entire office are divided into a number of "even" and "odd" load sections, each section including as nearly as possible an equal number of positions. The wiring of the key-set KS for a position in the "first odd load section" is shown in detail in Fig. 1 with the connection of the key-set KS to the outgoing trunk conventionally indicated. The wires which interconnect the keys of the positions in the first odd load section are multiplied together and extended via the six conductors $Ca$—$Cf$ to the stationary contacts of the two first odd load section relays OSR and OSR', the former relay being used to connect the first odd load section normally with the group of oscillators in Fig. 2 and the latter relay being used to connect said section with the group of oscillators in Fig. 4 in the event of an emergency as explained hereinafter.

Similarly, the key-sets KS (not shown) in the positions of the first "even" load section are connected to the stationary contacts of the two first even load section relays ESR and ESR' while the remainder of the other odd and even load sections into which the positions of the office are divided are similarly extended to corresponding odd and even load section circuits which are indicated but not shown in Fig. 3. Thus all the "odd" load sections are normally supplied by the group of oscillators shown in Fig. 2 while all the even load sections are normally supplied by the group of oscillators shown in Fig. 4.

To make the output of the two groups of oscillators available to each of their respective load sections, non-locking keys OSK and ESK individual, respectively, to each of the section relays OSR and ESR are operated long enough to close the obvious circuit of each relay ARO and ARE, respectively, and thereafter, the operating circuit of relays OSR and ESR, respectively. Relay ARO, upon operating, for example, locks over its own No. 4 contacts to resistance battery and further closes the circuit of relay OSR over a path which extends from battery through its winding, No. 2 contacts of relay ARO, No. 8 contacts of relay OSR', outer contacts of key OSK, conductor 1, No. 1 contacts of relay PT, conductor 2, back contacts of slow-release relay LD to ground. Relay OSR operates in this circuit, locks over its No. 7 contacts to ground on conductor 1 and by closing its Nos. 1–6 contact pairs, extends the output windings of the transformers MC1—MC6 to the conductors Ca—Cf which, as above explained, extend in parallel to each of the positional key-sets KS in the first odd load section. The closure of any key in the key-set of any position in this section will then cause the secondary windings of two of these transformers to be connected in series to the trunk, whereby the separate frequencies generated by the two oscillators in Fig. 2 which are connected to the primaries of said two transformers are caused to be applied to the trunk as long as the key remains depressed.

In the same manner the operation of key OSK for each of the other odd sections (not shown) will cause the associated relays ARO (not shown) to operate to in turn, operate the corresponding load section relay OSR (not shown), each of the latter locking over their respective No. 7 contacts to ground on conductor 1 and extending the conductors of the oscillators in Fig. 2 to different groups of conductors Ca—Cf each extending in parallel to each positional key-set KS in the involved odd section, to supply the desired frequencies over the connected trunks in accordance with the operated individual keys of the several key-sets.

Likewise, the operation of key ESK for each "even" section, completes an obvious circuit of each of the associated relays ARE each of which, upon operating, locks over its No. 4 contacts and completes a circuit for the associated relay ESR, one such circuit typical of all the others being the one shown in Fig. 3 for relay ESR of the first even load section, said circuit extending from battery through the winding of relay ESR, No. 2 contacts of relay ARE, No. 8 contacts of relay ESR', outer contacts of key ESK, No. 1 contacts of relay PT1, conductor 7, back contacts of relay LD1, to ground on conductor 6. Relay ESR operates over this circuit and locks to operating ground over its No. 7 contacts. Over its No. 1–6 contact pairs, relay ESR extends the output windings of the transformers MC1'—MC6' in Fig. 4 to the conductors Ca—Cf (not shown) of the first even load section, said conductors being extended in parallel to the key-set KS of each position in said section for the application thereto upon the depression of an individual key thereat of two frequencies to the trunk. As in the case of the group of oscillators in Fig. 2 which supplies the frequencies to the key-sets of the positions in the odd sections and in which the combinations of two frequencies are applied to the trunk by the serial connection thereto of the output windings of the two involved transformers MC—, so the combinations of two frequencies are similarly applied to the trunks connected to the even section positions, upon the depression of the individual keys, by the serial connection thereto of the output windings of the two involved transformers MC—' the primary windings of which are respectively connected to the involved two oscillators.

Thus, by the operation of each of the odd section relays OSR, the output of the six oscillators in Fig. 2 is normally made available to the positions of that half of the office which are included in the odd section subdivisions thereof, and by the operation of each of the even section relays ESR, the output of the six oscillators in Fig. 4 is normally made available to the positions of that half of the office which are included in the even section subdivisions thereof.

It will be recalled the common wire GD connecting the lower terminals of the output windings of transformers MC1—MC6 is connected to the first terminal of the arc accessible to brush TS1 and is further multipled to the succeeding five terminals thereof, and that the common wire GD' connecting corresponding terminals of the output windings of transformers MC1'—MC6' is connected to the seventh terminal of this arc and is further multipled to the succeeding five terminals thereof. It will further be recalled that from the upper terminal of the output winding of each of said transformers a wire MCXW, or MCX'W extends to a terminal in the arc accessible to brush TS2, the six conductors MC1W—MC6W from the transformers MC1—MC6 being consecutively connected to the first six terminals of said arc and the six conductors MC1'W—MC6'W from the transformers MC1'—MC6' being consecutively connected to the next six terminals of said arc.

Figure 5:
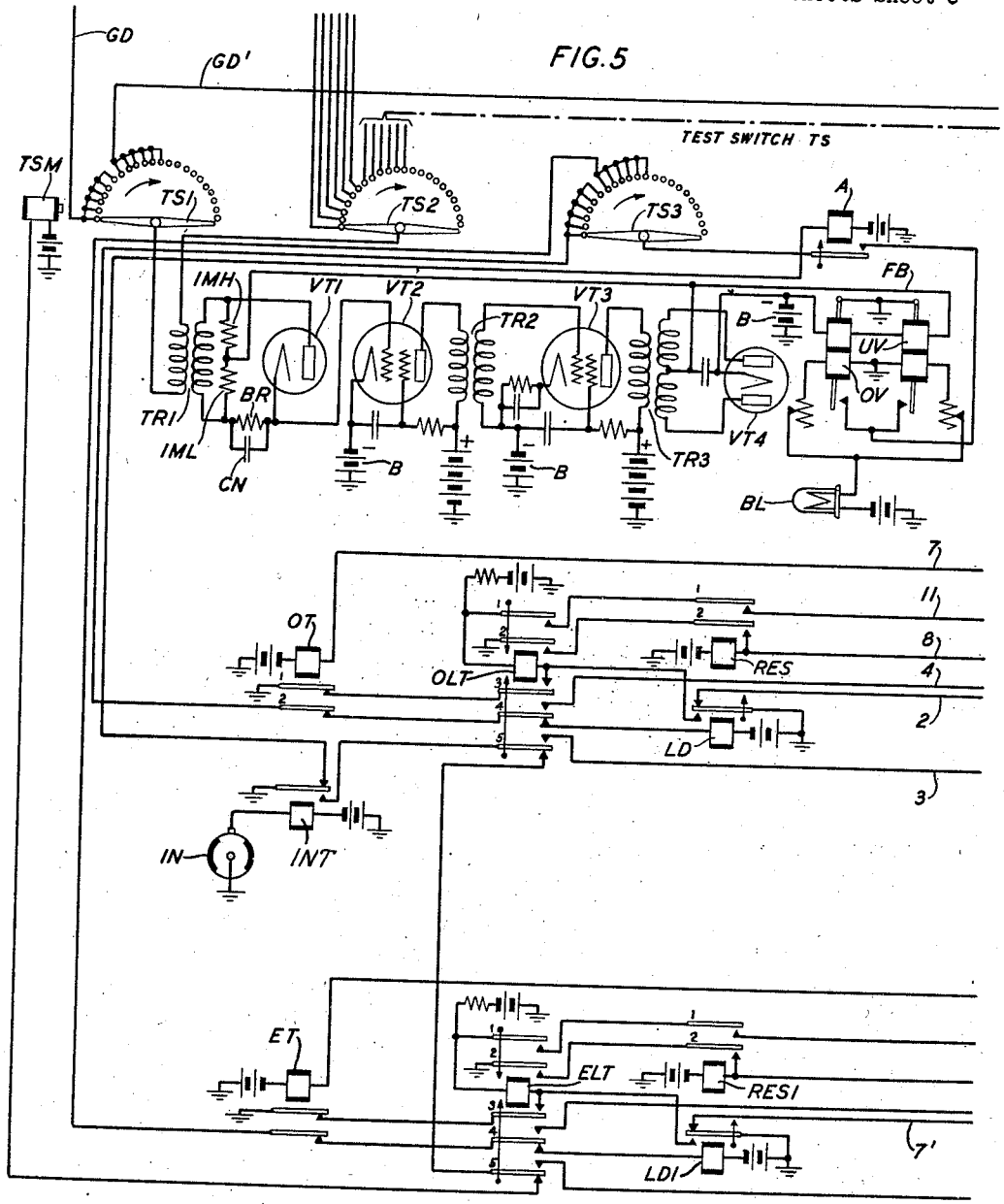

The circuit shown in Figs. 5 and 6 and of which the test switch TS forms a part, is intermittently operated to test the output of each oscillator in each of the two groups, and the essence of the test is to determine whether the output voltage of each of the oscillators is within predetermined maximum and minimum limits. The test circuit, in its intermittent rounds of the oscillators in both groups, tests each oscillator for both the maximum and minimum voltage limits. If the voltage is within the limits, the test circuit passes on to the next oscillator. If the voltage is outside of the limits, all load sections obtaining their signal frequency voltages from the group of oscillators which includes the oscillator failing to pass the test, are immediately disconnected therefrom and the presumably offending oscillator is then retested. If this oscillator again fails to pass the test, it is assumed that some trouble condition exists within the oscillator itself or in the common wiring between the oscillator and the common conductors to the section-connecting relay OSR or ESR, in which event all the sections supplied by the group of oscillators that includes the oscillator failing to pass the test are then switched over to the other group of oscillators, the latter now supplying the signal frequencies to every position in the office. On the other hand, if the oscillator passes the retest, it is then assumed that the trouble condition is not with the oscillator itself or in the common wiring but in some position or positions in one of the sections normally served by the group of oscillators which includes this oscillator. Under these circumstances, one section at a time of the previously disconnected sections is reconnected to the group of oscillators and the test of the oscillator is repeated after each reconnection until that section is reached which reproduces the failure of the oscillator. This section is then locked out of service for further investigation while all the other sections are then reconnected to the oscillator group.

Referring now to Figs. 5 and 6, the interrupter IN interrupts the circuit of relay INT at suitable intervals. Let it be assumed that the brushes TS1 and TS2 of the switch TS are connected to the first terminals of their respective arcs thereby causing the test circuit to be connected, via brushes TS1 and TS2, to the output of the first oscillator Fa in the group shown in Fig. 2, said output being delivered to the positions of the first odd sections through the output winding of transformer MC1 and made accessible to the test circuit through conductor GD and conductor MC1W. When the interrupter IN is on an insulating segment, relay INT is normal and an obvious circuit is completed for relay A, which is slow operating and comes up after an interval. As explained later, the relays which respond to an over-voltage or an under-voltage condition in the oscillator being tested are the polarized relays OV and UV, respectively. Now if, at the time relay A operates, the armatures of both of these relays are out of engagement with their respective fixed contacts, then the voltage output of the oscillator is within the prescribed limits and nothing occurs after relay A has operated. When interrupter IN closes a conducting segment, relay INT is operated and a circuit is then completed for magnet TSM of the test switch TS, said circuit extending from ground on the front contacts of relay INT, No. 5 back contacts of the odd load test relay OLT, No. 5 back contacts of the even load test relay ELT, winding of magnet TSM to battery. Magnet TSM operates and prepares the brushes TS1, TS2, and TS3 to advance, and when the magnet releases, which it does when interrupter IN makes an insulating segment, relay INT releases, the circuit of magnet TSM is opened at the front contacts of relay INT and brushes TS1, TS2 and TS3 are advanced into engagement with their respective second terminals. The brushes TS1, TS2 and TS3 of the test switch are thus progressively advanced, under the control of relay INT, to successive terminals in their respective arcs and thus cause the test circuit to be brought into successive engagement, first with each of the six oscillators in Fig. 2 and thereafter with each of the six oscillators in Fig. 4.

This progressive connection of the test circuit to the different oscillators is, however, conditioned upon the assumption that the test of the output voltage made on each connection is within the prescribed limits for the oscillator then being tested, in which case relays OV and UV remain "normal" and no further action occurs after the operation of relay A. When the voltage is outside of these limits, however, further progression of the switch TS is arrested until it has been determined whether the cause of the abnormal voltage is in the oscillator itself or in one of the sections connected thereto and appropriate disposition is made of the oscillator or of the section as the case may be.

The circuit which tests the output voltage of each oscillator through brushes TS1 and TS2 is a feedback amplifier which comprises a transformer TR1 the input winding of which is connected between brushes TS1 and TS2, a two element vacuum tube VT1 connected across the output of this transformer, a tetrode (or any equivalent) "variable $\mu$" vacuum tube VT2 inductively coupled to the amplifier tube VT3 by means of transformer TR2, a power rectifier tube VT4 inductively coupled to the tube VT3 by transformer TR3 and the two polarized relays OV and UV whose operating (upper) windings are serially connected by means of conductor FB between a source of negative battery —B and the mid-point of the output winding of transformer TR3, said conductor FB being further extended to the junction of the resistors IMH and IML bridged across the secondary winding of transformer TR1.

When brushes TS1 and TS2 of the switch TS are connected to any particular set of terminals, say the first, the voltage output of the oscillator Fa in Fig. 2 is applied to the transformer TR1 through which, after suitable stepping up, it is applied to the cathode and anode of the rectifier VT1. Since the tube conducts in one direction only, then, during the positive half cycles, current flows through the tube in series with the output winding of transformer TR1, including the bias resistor BR and the condenser CN in parallel therewith, said condenser acquiring a full charge during the flow of current. During the negative half cycle no current, of course, flows through the rectifier circuit above traced, but the condenser CN now discharges across resistor BR which thereby is provided with a sustained voltage of practically constant value during both half cycles of the stepped-up oscillator voltage, the voltage being acquired directly from the current flow in the positive half cycles and from the discharging condensers in the negative half cycles.

The right common junction of resistor BR and condenser CN is connected to the control grid of the tube VT2 and the direct current potential available across resistor BR during both positive and negative half cycles is applied as a positive bias to said grid and thereby sharply increasing the cathode-anode current of the tube. However, during both positive and negative half cycles there is developed an alternating potential across the resistor IML which is proportional to the incoming stepped-up voltage and this potential, being superimposed upon the direct potential across resistor BR, acts as an alternating potential bias on the grid of the tube VT2. The consequence is that while the direct voltage bias operates sharply to amplify the cathode-anode current through the tube, the superimposed alternating voltage bias operates to produce an alternating cathode-anode current in accordance with the variations of the superimposed alternating voltage. This alternating current produces a corresponding alternating voltage within the transformer TR2 which is applied to the grid of the amplifier tube VT3 which, in response thereto, operates in the well-known manner suitably to amplify the cathode-anode current thereof. This current produces an alternating voltage through transformer TR3 which is applied to the full wave rectifier tube VT4 which thereby converts the amplified alternating voltage into a direct voltage which is applied, via conductor FB, to the circuit of the upper windings of relays UV and OV terminating in the source of negative potential —B. The difference of direct current potential between that available on conductor FB from the rectifier tube VT4 and that available from the source of potential —B determines the operating conditions of relays OV and UV.

It will be observed that conductor FB is extended back to the common terminal of the resistors IMH and IML. The voltage on the grid of the variable $\mu$ tube VT2 is thus made up of four parts, namely, a positive direct current voltage across resistor BR proportional to the peak amplitude of the incoming signal, a negative direct current voltage equal to the output of rectifier VT4 (and therefore equal to the operating voltage for relays OV and UV), an alternating current voltage which acts as a carrier signal to permit the use of transformer coupling between the amplifier stages and the voltage of battery —B. As is well known, the direct current grid voltage in a variable μ tube is used to control the amplification of the tube and this amplification is increased as the grid bias is moved in the positive direction with respect to the cathode. The direct current voltage developed across resistor BR tends to increase the amplification of tube VT2 and hence increase the output of tube VT4. The output of tube VT4, poled oppositely to that from tube VT1, tends to decrease the amplification of tube VT2. This negative feedback, produced by connecting the output of tube VT4 to the grid circuit of tube VT2, stabilizes the amplification of the whole amplifier and makes the output voltage vary faithfully in proportion to the input voltage as represented by the direct current voltage across resistor BR, in spite of variations in battery supply and amplification constants of the tubes and other component parts of the circuit.

Both of relays UV and OV are polarized, as before stated, each having a lower bias winding through which current can be adjusted by the indicated slide-wire devices to any desired value from the battery available through the ballast lamp BL. Now the bias current flowing through the lower winding of relay UV (the relay which responds to an under voltage on an oscillator being tested) is of such a value that when the current through the upper winding produced by the rectified voltage available on conductor FB is equal to or greater than the proportional amplification at tube VT1 of the prescribed minimum voltage to be emitted by an oscillator, said current through the upper winding overpowers the current through the biasing winding and the armature of the relay moves away from the stationary contact and is out of engagement therewith. On the other hand, the current flowing through the bias winding of relay OV (the relay which responds to an over voltage from an oscillator being tested) is adjusted to such a value that when the current through the upper winding produced by the rectified voltage available on conductor FB is equal to or less than the proportional amplification through tube VT1 of the prescribed maximum voltage to be emitted by an oscillator, the current through the bias winding overpowers the current through the upper winding and the armature of the relay moves away from the stationary contact and is out of engagement therewith. Obviously, if the oscillator voltage falls below the minimum limit, the rectified voltage is reduced in proportion, the current through the bias winding of relay UV predominates and the armature of the relay operates to engage the stationary contact and thereby apply ground to the stationary contact of relay A. Should the oscillator voltage rise above the predetermined limit, the rectified voltage available at tube VT4 is raised in proportion and the current through the upper windings of relays UV and OV is raised to a value that will predominate over the current through the bias winding of relay OV whereupon the armature of the latter will then operate to engage the stationary contact and ground is again caused to be applied to stationary contact of relay A. Hence to summarize briefly the results of the operation of the feedback amplifier, when the voltage of the oscillator being tested is lower than minimum, relay UV operates to apply ground to the stationary contact of relay A; when the voltage is higher than maximum, relay OV operates to apply ground to the contact of relay A.

Returning now to the operation of the test circuit, when the brushes TS1 and TS2 of the test switch are engaged with their corresponding first terminals, the voltage output of the first oscillator Fa in Fig. 2 is applied to the transformer TR1, and during the time that the brushes are thus engaged with their respective first terminals (which is the time measured by the insulating segment of interrupter IN) not only is relay A operated, but the oscillator voltage is amplified as above described and applied to the relays OV and UV. If the voltage is within the minimum and maximum limit, both relays UV and OV will remain unoperated so that when magnet TSM operates consequent to the operation of relay INT at the end of an insulating segment of interrupter IN, the test circuit will have successfully tested oscillator Fa in Fig. 2 and the switch magnet TSM will operate to move the brushes TS1, TS2 and TS3 to the next set of terminals where an identical test of the next oscillator is then performed. Thus, with every step of the first six steps of the test switch TS, one of the six oscillators Fa—Ff in Fig. 2 is tested for over-voltage and under-voltage conditions, and with every step of the next six steps of the switch one of the corresponding six oscillators Fa—Ff in Fig. 4 is tested. The tests are, of course, made continuously, but it is evident that the circuit can be easily modified by suitable delay means to have them performed as frequently as desired.

Let it be supposed, however, that the voltage output of one of the six oscillators in Fig. 2, the first oscillator Fa, for instance, is outside of the prescribed limits, and let it be further supposed that the voltage is lower than the prescribed minimum. As a consequence, relay UV releases and closes the contacts. Since relay A is operated, a circuit is completed from ground, the contacts of relay UV, contacts of relay A, brush TS3 and engaged first terminal, No. 2 contacts of relay OT, No. 4 back contacts of relay OLT, winding of slow-release relay LD to battery. Relay LD operates, removes ground from conductor 2 and completes an obvious circuit for relay OLT which operates and, among other things, locks over its No. 3 contacts to ground on the No. 1 contacts of relay OT. The removal of ground from conductor 2 removes it from conductor 1 in consequence of which all the relays OSR locked to ground on said conductor are released and all the odd load sections are caused thereby to be disconnected from the oscillators in Fig. 2. Relay OLT, in breaking its No. 5 back contacts, opens the circuit of magnet TSM and the brushes of the switch TS are then held on the terminals of the oscillator under test. By closing its No. 5 front contacts, relay OLT further completes the circuit of switch magnet OSCM of the odd control switch OSC, said circuit extending from ground on the front contact of relay INT (when the latter operates on the closed period of the interrupter IN) No. 5 front contacts of relay OLT, conductor 3, winding of switch magnet OSCM to battery. On the release of relay INT, magnet OSCM releases and brushes O1, O2 and O3 of switch OSC are advanced to their respective second terminals.

With the odd sections disconnected from the group of oscillators in Fig. 2 and with the brushes TS1, TS2 and TS3 still connected to the first oscillator Fa in said figure at the time that brushes O1, O2 and O3 reach their respective second terminals, relay UV will either have released or will still be operated, depending upon whether or not the disconnection of the odd sections will have caused the voltage output to become normal. If the cause of the under-voltage output is due to some abnormality in any position (or positions) in any of the odd sections, then the disconnection of these sections from the oscillators will cause the voltage output of the oscillator under test to return to normal and will cause relay UV to release in consequence thereof. On the other hand, if the cause of the abnormality is in the oscillator itself or in any of the common wiring, the voltage output will remain below normal when the sections are disconnected and relay UV will then remain operated, whereupon a circuit will then be completed for relay PT which extends from ground through the contacts of relay A, brush TS3 and engaged first terminal, No. 2 contacts of relay OT, No. 4 front contacts of relay OLT, conductor 4, No. 3 contacts of relay PT, brush O2 and engaged second terminal, winding of relay PT to battery. Relay PT operates, locks over its No. 4 contacts to ground on the restoring key RKO, opens its No. 1 contacts to prevent ground from being again applied to conductor 1 upon a subsequent release of relay LD, closes an obvious circuit to any suitable alarm over its No. 2 contacts, and, over its No. 5 front contacts, applies ground to brush O3 which, however, is of no effect at this time since the second terminal of the arc to which this brush has access is vacant. On the next operation of relay INT, the circuit of magnet OSCM is again closed to operate said magnet and, upon the release thereof when relay INT releases, brushes O1, O2 and O3 are advanced to their respective third terminals. Since ground was previously connected to brush O3 by the No. 5 front contacts of relay PT, a circuit is completed for relay OSR', said circuit extending from ground on brush O3, conductor 5, No. 8 contacts of relay OSR which is now normal, No. 1 contacts of relay ARO, winding of relay OSR' to battery. Relay OSR' operates and locks over a circuit extending from battery through its winding, No. 8 contacts of relay ARO, No. 1 contacts of relay OSR, No. 7 contacts of relay OSR', conductor 6, No. 1 contacts of relay PT1, conductor 7, back contacts of relay LD1 to ground. Relay OSR' by closing its Nos. 1—6 contact pairs, connects the first odd section to the six oscillators in Fig. 4, which oscillators now supply the signal frequencies not only to all the even load sections of the office through the Nos. 1—6 contact sets of relays ESR but also, as an emergency, to the first odd section which normally gets its own signal frequencies from the six oscillators in Fig. 2 now cut out of service.

On the next step of the switch OSC, brushes O1, O2 and O3 are advanced into engagement with their respective fourth terminal whereupon ground on brush O3 is applied to conductor 5', which, corresponding to conductor 5, completes the circuit of relay OSR' (not shown) of the second odd section, the relay operating to connect said section to the group of oscillators in Fig. 4 and locking to conductor 6 as previously described for relay OSR' of the first odd section. Thus with each step of the switch OSC the positions of succeeding odd sections of the office are switched to the group of oscillators in Fig. 4 (which normally carry only the even odd sections), until all the positions in the office are carried by said oscillators. When the brushes O1, O2 and O3 are stepped around back to their respective first terminals, a circuit will be completed for relay OT, extending from ground on the No. 5 front contacts of relay PT, brush O3 and engaged first terminal, conductor 7, winding of relay OT to battery. This relay operates and opens the locking circuit of relay OLT, causing the latter relay to release and reestablish the path of relay LD. The test circuit is now restored to normal and the brushes of switch OSC are engaged with their respective first terminals. The odd sections of the office, however, remain connected to the group of oscillators in Fig. 4 while the group of oscillators in Fig. 2, being out of service, oscillator Fa therein may be examined for the cause of the abnormal voltage.

When the trouble has been cleared from the oscillator Fa in Fig. 2 and it is desired to switch the odd load sections back on to the oscillators in said figure, key RKO is operated to release relay PT, and the three-position non-locking keys MKO for each of the odd sections are operated to the left. The operation of each key MKO closes an obvious circuit for its associated relay OSR, which then operates to switch in its own odd load section back to the oscillators in Fig. 2, and to open the locking circuit of the corresponding relay OSR' which, upon releasing, disconnects this odd load section from the group of oscillators in Fig. 4. Since relay PT is now normal, the operated relays OSR lock to ground on the back contacts of relay LD over conductors 1 and 2, respectively.

The above operations have been predicated upon the assumption that when the odd load sections (for example) are switched over to the group of oscillators in Fig. 4, the "repeat" test in the offending oscillators in Fig. 2 still indicated the presence of the trouble and that, therefore, the trouble must be in the oscillator itself or any of the common wiring thereof rather than in any of the positions of the switched-over load sections. It may be, however, that the repeat test clears with the switching and the inference will then be that the trouble is in some load section or position therein.

Assuming, then, that by the time that brushes O1, O2, and O3 of switch OSC have been advanced to their respective second terminals, relay UV will have been restored to normal, indicating thereby that the voltage output of the oscillator under test has returned to normal. No circuit will then be completed for relay PT, in which event a circuit is closed for relay RES extending from ground on the No. 5 back contacts of relay PT, brush O1 and engaged second terminal, conductor 8, winding of relay RES to battery. This relay operates and locks over its No. 2 contacts to ground on the No. 2 contacts of relay OLT but otherwise performs no function at this time.

When brushes O1, O2 and O3 have been advanced to their respective third terminals, a circuit is completed for relay OSR of the first odd section, said circuit extending from ground on the No. 5 back contacts of relay PT, brush O1 and the engaged third terminal, conductor 9, No. 8 contacts of relay OSR', No. 2 contacts of relay ARO, winding of relay OSR to battery. This relay operates, locks over a previously traced circuit to ground on the back contacts of relay LD and switches the first odd load section back on to the group of oscillators in Fig. 2. When this connection is thus established, the test circuit, which is stopped on the terminals of oscillator Fa that failed to pass the voltage test, is ready to retest the voltage output therefrom. If the cause of the trouble which caused the oscillator voltage to fall below the prescribed minimum is some condition local to the first odd section now switched in by the operation of relay OSR, then its reconnection to the oscillators will again produce the drop in voltage, relay UV will again operate and ground will be applied to conductor 4. Since brush O2 is connected to the third terminal of its arc, said ground will then be applied to conductor 10 which, being connected with resistance battery that holds relay ARO of the first odd section locked, shunts said relay which, upon its release, unlocks relay OSR of the first odd section and thereby disconnects this section from the oscillator. A suitable load section alarm, conventionally indicated in Fig. 3 for each load section switching circuit, is then operated either by ground on the No. 3 contacts of relay ARO or by ground through the No. 9 back contacts of relays OSR and OSR', respectively, to call attention to the defective section, it being understood that this alarm also serves as a reminder that key MKO for this section is to be left in its middle or non-operated position.

The control switch OSC, with each step taken, closes a circuit for relay OSR for each successive odd section, said circuit being similar to the one above traced for relay OSR of the first odd section. As each relay OSR is operated, the section individual thereto is switched back into service with the group of oscillators in Fig. 2 that normally serves it. If there should be more than one section causing the voltage of the oscillator under test to become abnormal, then each of such sections will be automatically locked out for maintenance service as a result of the temporary reconnection of the section to the oscillators.

When the brushes of the control switch OSC have been stepped back to their respective first terminals, ground is applied from the No. 5 back contacts of relay PT, brush O1 and engaged first terminal, conductor 11, No. 1 contacts of relay RES No. 1 contacts of relay OLT to resistance battery, thereby shunting and releasing relay OLT which, in turn, releases relay RES. The circuit of the magnet TSM of the test switch TS is now reclosed and the brushes of said switch resume their advance.

It will be observed that when brushes TS1, TS2 and TS3 of the test switch TS have advanced to their respective seventh terminals, the primary winding of transformer TR is connected, via brushes TS1 and TS2, to the secondary winding of transformer MC1' which is inductively connected to the oscillator Fa in Fig. 4. The same under- and over-voltage test is now made of this oscillator as was made of the corresponding oscillator Fa in Fig. 2, and the result of such test, if it indicates an abnormal condition, will be effective to cause the operation of the relays ET, ELT, LD', RES1 and the even control switch ESC to lock out the even sections, to retest the presumably defective oscillator, and to switch back in succession each of the odd sections if the cause of the abnormality appears to be in one or more of the load sections rather than in the oscillator itself. Since these operations are identical with those previously described for relays OT, OLT, LD, RES1 and the odd control switch OSC, the circuits thereof are not described, the same being obvious from the drawings.

While I have described my invention and the means of utilizing the same in connection with its application to a particular kind of voltage supply test circuit, it is to be understood that various other applications and embodiments thereof may be made by those skilled in the art without departing from the spirit of the invention as defined within the scope of the appended claims.

What is claimed is:

1. The combination with an electric power source and a plurality of loads connected thereto, of means for intermittently testing and retesting for the normal voltage output of said source, means responsive to an abnormal voltage of said source for disconnecting said loads from said source and reconnecting them thereto in succession prior to a retest, and means for locking said source out of service if the retest indicates an abnormal voltage of said source.

2. In combination, a plurality of electric power sources divided into two groups, a plurality of loads for said sources also divided into two groups, means for connecting said two load groups to one of said groups of power sources, means for testing intermittently each of said power sources for a predetermined output voltage, and means responsive to said testing means when testing a source delivering an abnormal voltage for disconnecting the plurality of loads from the group of power sources that includes said source and connecting said plurality of loads to the other group of power sources.

3. In combination, a plurality of electric power sources divided into two groups, a plurality of loads for said sources divided into two main groups with each main group further divided into a plurality of subgroups, means for connecting all the subgroups of one main group of loads to one group of sources, means for connecting all the subgroups of the other main group of loads to the other group of sources, means for testing intermittently each of said sources for a predetermined voltage output, means responsive to said testing means when responding to an abnormal voltage output from one of said sources for disconnecting the one main group of loads from the group of power sources that includes said source, and means responsive to said last-mentioned means for connecting said main group of loads to the other group of power sources.

4. In combination, a plurality of electric power sources divided into two groups, a plurality of loads for said two groups of power sources divided into two main groups with each main group further subdivided into a plurality of subgroups, means for connecting all the subgroups of one main group of loads to one group of sources, means for connecting all the subgroups of the other main group to the other group of sources, means for testing intermittently each of said sources for a predetermined voltage output, means responsive to said test means when responding to an abnormal voltage from one of said sources for disconnecting the main group of loads from the groups of power sources that includes said source, and means responsive to another test of said last-mentioned power source after said disconnection for connecting said main group of loads to the other group of power sources if said test again indicates an abnormal voltage output from said power source.

5. In combination, a plurality of electric power sources divided into two groups, a plurality of loads for said power sources divided into two main groups with each main group further subdivided into a plurality of subgroups means for connecting all the subgroups of one main group of loads to one of the group of power sources, means for connecting all the subgroups of the other main group of loads to the other group of power sources, means for testing intermittently each power source for a predetermined output voltage, means in said testing means responsive to an abnormal voltage from a power source under test for disconnecting the main group of loads from the group of power sources that includes said power source, means responsive to an abnormal voltage from said power source after said disconnection for connecting said main group of loads to the other group of power sources, means responsive to a normal voltage output from said power source after said disconnection for reconnecting in succession to said main group of power sources that includes the source under test each of the associated subgroup loads and for retesting said power source for the normal voltage output after the reconnection of each of said subgroup loads, and means responsive to an abnormal voltage output after a reconnection for locking out of service the subgroup load reconnected prior to the last test.

6. The combination with a plurality of oscillators connected to a load divided into a plurality of sections, of a test circuit for checking the integrity of the connections between the several load sections and the oscillators, comprising means responsive to an abnormal voltage output from an oscillator for disconnecting all load sections from all of the oscillators, means for thereafter retesting the voltage output from said oscillator, means responsive to an abnormal voltage on retest for locking said oscillators out of service, and means responsive to a normal voltage on retest for connecting each of the several load sections in succession to the plurality of oscillators and to retest said oscillator after the reconnection of each load section, and means responsive to an abnormal voltage on retest of said oscillator for locking out of service the load section connected to said oscillators immediately prior to said retest.

7. In a telephone system, the combination with a plurality of positions each equipped with means for connecting with trunks over which signal frequencies are to be transmitted, of a plurality of frequency sources normally connected to said positions and each adapted to supply said positions with frequencies within predetermined normal voltage limits, means responsive to an abnormal voltage from any one of said frequency sources for disconnecting said positions from all of said sources, means responsive to a normal voltage from said source after disconnection for reconnecting each position to all of said sources and for retesting the source for the voltage output thereof after the reconnection of each position, and means responsive to an abnormal voltage from said source after the reconnection of a position for disconnecting said position from all of said sources and locking it out of service.

8. In a telephone system, the combination with a plurality of positions each equipped with means for connecting with trunks over which signal frequencies are to be transmitted, of a plurality of frequency sources adapted to supply their respective frequencies within predetermined normal voltage limits, connecting means individual to each position for extending said sources to all of said positions, and a voltage test circuit for testing intermittently the output voltage of each of said frequency sources, comprising means responsive to an abnormal voltage from a frequency source for releasing said connecting means whereby all of said positions are disconnected from all of said frequency sources, and means responsive to a normal voltage from said frequency source after all said positions are disconnected from all of said sources for operating each of said connecting means in succession, whereby the position associated with a connecting means is reconnected to all of said frequency sources, said testing means reoperating after the connection of a position to said sources to determine the voltage output of the source under test, and means responsive to the operation of said testing means in response to an abnormal voltage for releasing the last operated connecting means and locking out of service the position associated with said connecting means.

9. In a telephone system, the combination with a number of positions divided into a plurality of groups, each of said positions being provided with means for connecting with trunks over which signal frequencies are to be transmitted, of two groups of frequency sources with each group normally connected to a different plurality of said groups of positions, means for testing intermittently each of said frequency sources for an abnormal voltage and for operating in response to an abnormal voltage, means responsive to the operation of said testing means for disconnecting the groups of positions normally connected to the group of frequency sources which include the source emitting the abnormal voltage, and other means also responsive to the operation of said testing means for connecting said groups of positions to the other group of frequency sources.

10. A voltage test circuit for testing the output voltage of each oscillator in two groups of oscillators, each of said two groups being normally connected to a plurality of load outlets, comprising a voltage detector connected intermittently to each of said oscillators, means responsive to said detector when operating in response to an abnormal voltage for disconnecting all load outlets from the group of oscillators which includes the oscillator under test, means thereafter responsive to the continued operation of said detector for connecting said load outlets to the other group of oscillators, and means responsive to said detector when operating in response to a normal voltage from said oscillator after said load outlets have been disconnected from the one group of oscillators which includes said oscillator for reconnecting each load outlet back to said group of oscillators and for disconnecting said load outlet from the other group of oscillators, said detector remaining connected to said oscillator under test during such reconnections, and means responsive to the operation of said detector in response to an abnormal voltage after any reconnection for locking out of service the load outlet involved in said reconnection.

BURTON McKIM.

REFERENCES CITED

The following references are of record in the file of this patent:

UNITED STATES PATENTS

| Number | Name | Date |
|---|---|---|
| 1,558,448 | Anderson | Oct. 20, 1925 |
| 1,743,795 | Nankivell | Jan. 14, 1930 |
| 2,152,472 | Fyler | Mar. 28, 1939 |
| 2,235,540 | Stevens | Mar. 18, 1941 |
| 2,329,010 | Spencer | Sept. 7, 1943 |
| 2,245,342 | Hoye | June 10, 1941 |